(12) United States Patent
Yamazaki

(10) Patent No.: US 8,267,219 B2
(45) Date of Patent: Sep. 18, 2012

(54) VEHICLE STEERING SYSTEM

(75) Inventor: Norio Yamazaki, Wako (JP)

(73) Assignee: Honda Motor Co., Ltd, Tokyo (JP)

( * ) Notice: Subject to any disclaimer, the term of this patent is extended or adjusted under 35 U.S.C. 154(b) by 210 days.

(21) Appl. No.: 12/755,898

(22) Filed: Apr. 7, 2010

(65) Prior Publication Data

US 2010/0252355 A1 Oct. 7, 2010

(30) Foreign Application Priority Data

Apr. 7, 2009 (JP) ................................. 2009-092603

(51) Int. Cl.
*B62D 5/04* (2006.01)
(52) U.S. Cl. ....... 180/444; 180/443; 180/446; 180/6.28; 180/65.1; 180/65.27; 701/41; 701/42; 701/43
(58) Field of Classification Search .................. 180/444, 180/443, 446, 6.28, 65.1, 65.27; 701/41, 701/42, 43
See application file for complete search history.

(56) References Cited

U.S. PATENT DOCUMENTS

| | | | |
|---|---|---|---|
| 6,122,912 A * | 9/2000 | Phillips | 60/413 |
| 6,691,013 B1 | 2/2004 | Brown | |
| 7,857,081 B2 * | 12/2010 | Kishimoto | 180/65.27 |
| 2002/0036429 A1 * | 3/2002 | Shimada et al. | 303/152 |
| 2003/0037977 A1 | 2/2003 | Tatara et al. | |
| 2003/0117012 A1 * | 6/2003 | Anwar et al. | 303/20 |
| 2005/0228564 A1 * | 10/2005 | Kato et al. | 701/41 |
| 2007/0294011 A1 * | 12/2007 | Yasui et al. | 701/41 |
| 2008/0097668 A1 * | 4/2008 | Tsuchiya | 701/42 |
| 2010/0006360 A1 * | 1/2010 | Kishimoto | 180/65.285 |
| 2010/0051377 A1 * | 3/2010 | Sugitani | 180/443 |
| 2010/0191423 A1 * | 7/2010 | Koyama et al. | 701/42 |
| 2010/0252355 A1 * | 10/2010 | Yamazaki | 180/446 |

FOREIGN PATENT DOCUMENTS

| | | |
|---|---|---|
| EP | 1555184 A2 | 7/2005 |
| EP | 1905670 A2 | 4/2008 |
| JP | 63-078878 A | 4/1988 |
| JP | 6-92252 A | 4/1994 |
| JP | 7-067216 A | 3/1995 |
| JP | 2004-352030 A | 12/2004 |
| JP | 2005-186831 A | 7/2005 |
| JP | 2006-231947 A | 9/2006 |
| JP | 2007-076579 A | 3/2007 |

* cited by examiner

*Primary Examiner* — Lesley D Morris
*Assistant Examiner* — Marlon Arce
(74) *Attorney, Agent, or Firm* — Arent Fox LLP

(57) ABSTRACT

In a steering system for a vehicle incorporated with a rear drive electric motor (5) for driving a pair of rear wheels (3*rl*, 3*rr*) that can function as a regenerative brake for the rear wheels, a steering torque control unit (38) reduces a steering assist torque provided by the power steering assist unit (21) when the rear drive electric motor is providing a regenerative braking. When the rear wheels are braked by a regenerative braking action without substantially applying a brake to the front wheel, the vehicle may acquire a temporal oversteer tendency. However, by increasing the effort required to steer the front wheels, such a tendency can be canceled or compensated, and the vehicle operator is enabled to control the vehicle without experiencing any unfamiliar feeling or discomfort. The effort required to steer the front wheels can be increased by decreasing the assist steering torque or providing a reactive steering torque at such a time.

10 Claims, 7 Drawing Sheets

VEHICLE STEERING SYSTEM

TECHNICAL FIELD

The present invention relates to a vehicle steering system that provides an assisting/reactive steering torque, and in particular to a vehicle steering system that adjusts the assisting steering torque according to the condition of the vehicle.

BACKGROUND OF THE INVENTION

A vehicle steering system is required to provide a steering reaction that reflects the vehicle condition and road condition for the vehicle operator to operate the vehicle in a comfortable way. The electric power steering system is increasingly widely used in current automobiles, and is often equipped with a control system that provides a reactive torque to the steering wheel according to various parameters such as the steering angle, yaw rate, vehicle speed and so on at the same time as providing an assisting steering torque.

According to a known vehicle steering system, when a disturbance such as a side wind is applied to a vehicle, an assisting steering torque that counteracts the disturbance is produced. This system comprises a manual steering means for allowing the steerable road wheels to be manually steered, an electric motor for applying a assisting steering torque to the steerable road wheel and a control means for adjusting the assisting steering torque produced by the electric motor according to an output of a vehicle condition detecting means. The control means detects changes in the output values of the vehicle condition detecting means for each unit time, and actuates the electric motor so as to cancel the changes. See Japanese patent No. 3110891 (patent document 1).

In case of an electric motor vehicle such as a pure electric motor vehicle and a hybrid vehicle using both an electric motor and an internal combustion engine, the rear wheels may be connected to an electric motor, and the electric motor may be used as a regenerative brake. However, when the regenerative brake is activated, it may affect the behavior of the vehicle to such an extent that the vehicle operator may experience an unfamiliar feeling or even a discomfort. This problem may be particularly acute when the regenerative brake is applied only to the rear wheels without using a disk brake or other mechanical brake to brake the front wheels. When the rear wheels are braked without braking the front wheels, the vehicle temporarily acquires an oversteer tendency. A steering system incorporated with a means for canceling external disturbances may detect such a behavior of the vehicle as a disturbance, and may be able to control the vehicle behavior. However, as the steering system would be able to detect the disturbance only after the yaw rate and other conditions of the vehicle have changed as a result of the actuation of the regenerative brake, the response of the steering system is necessarily delayed, and the unfamiliar response of the vehicle may not be adequately controlled.

BRIEF SUMMARY OF THE INVENTION

In view of such problems of the prior art, a primary object of the present invention is to provide a vehicle steering control system for a vehicle equipped with an electric motor operable as a regenerative brake which can avoid changes in the behavior of the vehicle when the regenerative brake is activated, and thereby improve the handling of the vehicle.

According to the present invention, such an object can be accomplished by providing a steering system for a vehicle incorporated with a rear drive electric motor for driving a pair of rear wheels that can function as a regenerative brake for the rear wheels, comprising: a steering mechanism for steering front wheels of the vehicle; a power steering assist unit configured to assist a manual effort to steer the front wheels; and a steering torque control unit configured to reduce a steering assist torque provided by the power steering assist unit when the rear drive electric motor is providing a regenerative braking.

When the rear wheels are braked by a regenerative braking action without substantially applying a brake to the front wheel, the vehicle may acquire a temporal oversteer tendency. However, by increasing the effort required to steer the front wheels, such a tendency can be canceled or compensated, and the vehicle operator is enabled to control the vehicle without experiencing any unfamiliar feeling or discomfort. The effort required to steer the front wheels can be increased by decreasing the assist steering torque or providing a reactive steering torque at such a time.

According to a preferred embodiment of the present invention, the steering torque control unit reduces a steering assist torque according to a regenerative power of the rear drive electric motor. Preferably, the rear wheels are driven by individual rear drive electric motors, and the steering torque control unit reduces a steering assist torque according to a difference between the regenerative powers of the rear wheels. Thereby, a particularly favorable control of the vehicle behavior can be achieved.

According to a certain aspect of the present invention, the steering torque control unit includes an assist torque setting unit for setting an assist torque that assists a steering effort and a reactive torque setting unit for setting a reactive torque that increases the steering effort, a final steering assist torque provided by the power steering assist unit being determined as a combination of the assist torque provided by the assist torque setting unit and the reactive torque provided by the reactive torque setting unit.

Typically, the reactive torque is determined as a mathematic function of a vehicle speed, a yaw rate of the vehicle and a regenerative power of the rear drive electric motor.

According to a particularly preferred embodiment of the present invention, the rear wheels are driven by individual rear drive electric motors, and the reactive torque is given as a mathematical function of a difference between the regenerative powers of the rear drive electric motors for the rear wheels.

BRIEF DESCRIPTION OF THE DRAWINGS

Now the present invention is described in the following with reference to the appended drawings, in which.

DETAILED DESCRIPTION OF THE PREFERRED EMBODIMENTS

In the following description, each wheel is denoted with numeral 4 and a suffix indicating the position of the wheel such as 4fl, 4fr, 4rl and 4rr appended thereto. When the wheels are generally referred to, only the numeral 4 may be used to denote each wheel.

Figure 1:
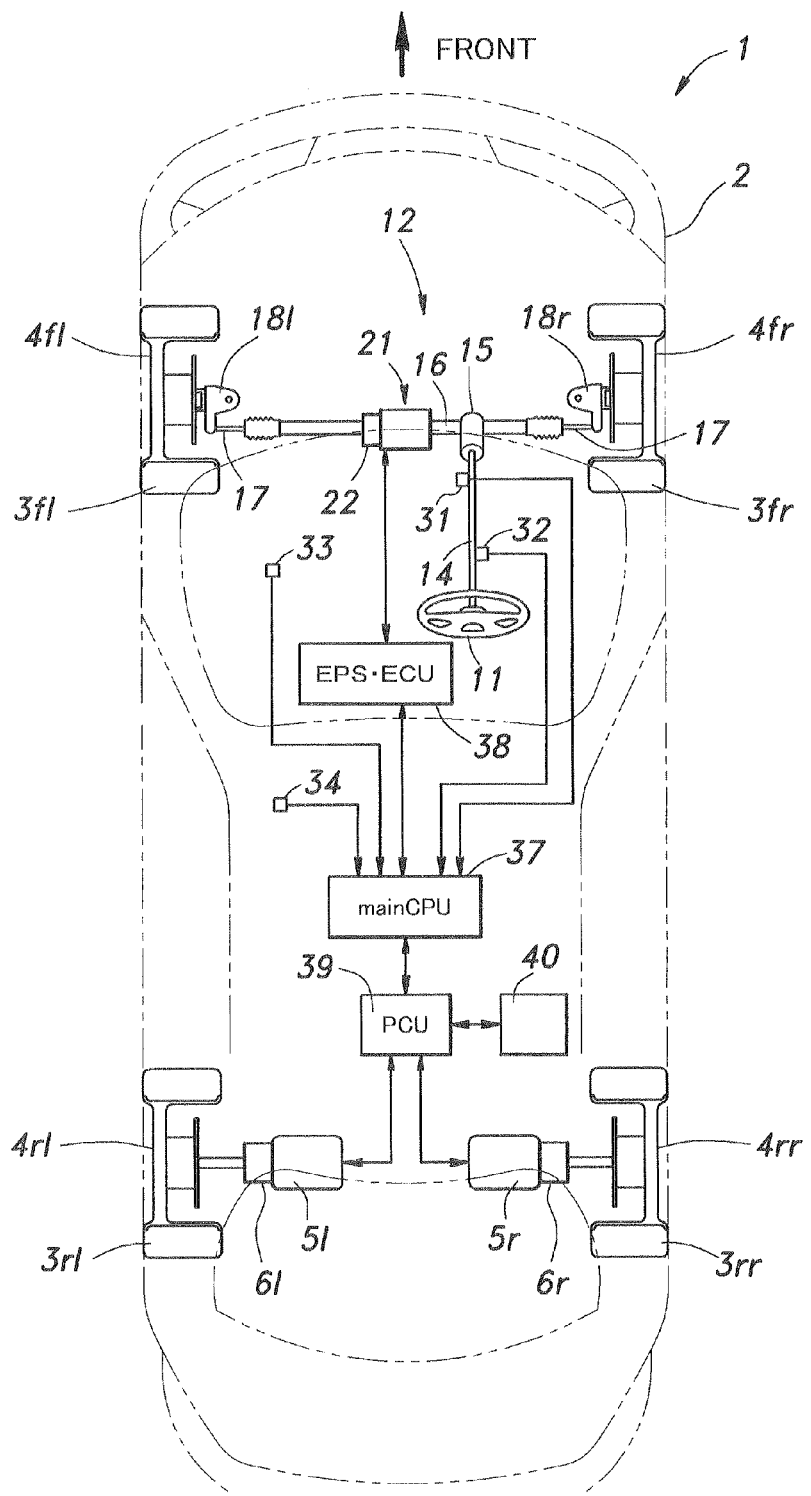
FIG. 1 is a schematic diagram of a motor vehicle equipped with an electric power steering system embodying the present invention.

Referring to FIG. 1, a vehicle 1 having a vehicle body 2 is provided with a pair of front wheels 4fl and 4fr each fitted with a pneumatic tire 3fl, 3fr and a pair of rear wheels 4rl and 4rr each fitted with a pneumatic tire 4rl, 4rr, and these wheels are supported by a vehicle body 2 via a corresponding wheel suspension system. The vehicle 1 consists of a four-wheel drive vehicle in which the front wheels are driven by an internal combustion engine not shown in the drawings and the rear wheels are driven by corresponding rear drive motors (rear wheel drive electric motors) 5l and 5r via corresponding gear mechanisms 6l and 6r, respectively.

The vehicle 1 is provided with a front wheel steering system 12 which allows the front wheels 4fl and 4fr to be directly steered from a steering wheel 11. The front wheel steering system 12 includes a rack and pinion mechanism comprising a pinion 15 integrally attached to a steering shaft 14 and a rack shaft 16 extending laterally with respect to the vehicle body 2 in a slidable manner and meshing with the pinion 15. The two ends of the rack shaft 16 are connected to knuckles 18l and 18r of the front wheels 4fl and 4fr via tie rods 17. Thereby, by turning the steering wheel 11 integrally attached to the steering shaft 14, the front wheels 4fl and 4fr can be steered in a corresponding manner. The front wheel steering system 12 further comprises an electric power steering system (EPS) 21 including an electric assist motor 22 that provides an assist torque for reducing the effort required for the vehicle operator to steer the front wheels.

Adjacent to the pinion 15 are provided a steering torque sensor 31 for detecting the manual steering torque T applied to the pinion 15 and a steering angular speed sensor 32 for detecting the angular speed ω of the steering wheel 11. A vehicle speed sensor 33 for detecting a vehicle speed and a yaw rate sensor 34 for detecting a yaw rate γ of the vehicle body are provided in appropriate parts of the vehicle body 2.

The vehicle 1 is further incorporated with a main ECU 37 responsible for the overall control of various onboard systems, an EPS CPU 38 for controlling the EPS 21 according to a control command from the main ECU 37 and a power control unit (PCU) 39 for controlling the actuation and regenerative braking action of the rear drive motors 5l and 5r according to the control command from the main ECU 37. The ECUs 37 and 38 and PCU 39 each essentially consist of a CPU, ROM, RAM, a peripheral circuit, an input/output interface and various drivers, and are mutually connected to one another via a communication system such as CAN (controlled area network) so as to be able to monitor one another with respect to various control values and states.

The main ECU 37 receives detection signals from the sensors 31 to 34, and forwards various control commands to the EPS ECU 38 and PCU 39 according to the received detection signals. The PCU 39 is connected to a nickel hydrogen rechargeable battery 40 for supplying electric power to the rear drive motors 5l and 5r. The rear drive motors 5l and 5r are provided with the function of a regenerative brake so that the electric power produced by the braking of the vehicle is charged to the battery 40.

The PCU 39 detects the regenerated electric power which is charged to the battery 40, and this information is forwarded to the EPS ECU 38 via the main ECU 37. Based on this information, the EPS ECU 38 controls the reactive torque as will be described hereinafter. According to an alternate embodiment, the PCU 39 computes a target regenerative power of the rear drive motors 5l and 5r according to the vehicle condition such as the engine rotational speed and battery charge state, and this target regenerative power may be used as the information to be forwarded to the EPS ECU 38, instead of the actual regenerated power.

Figure 2:
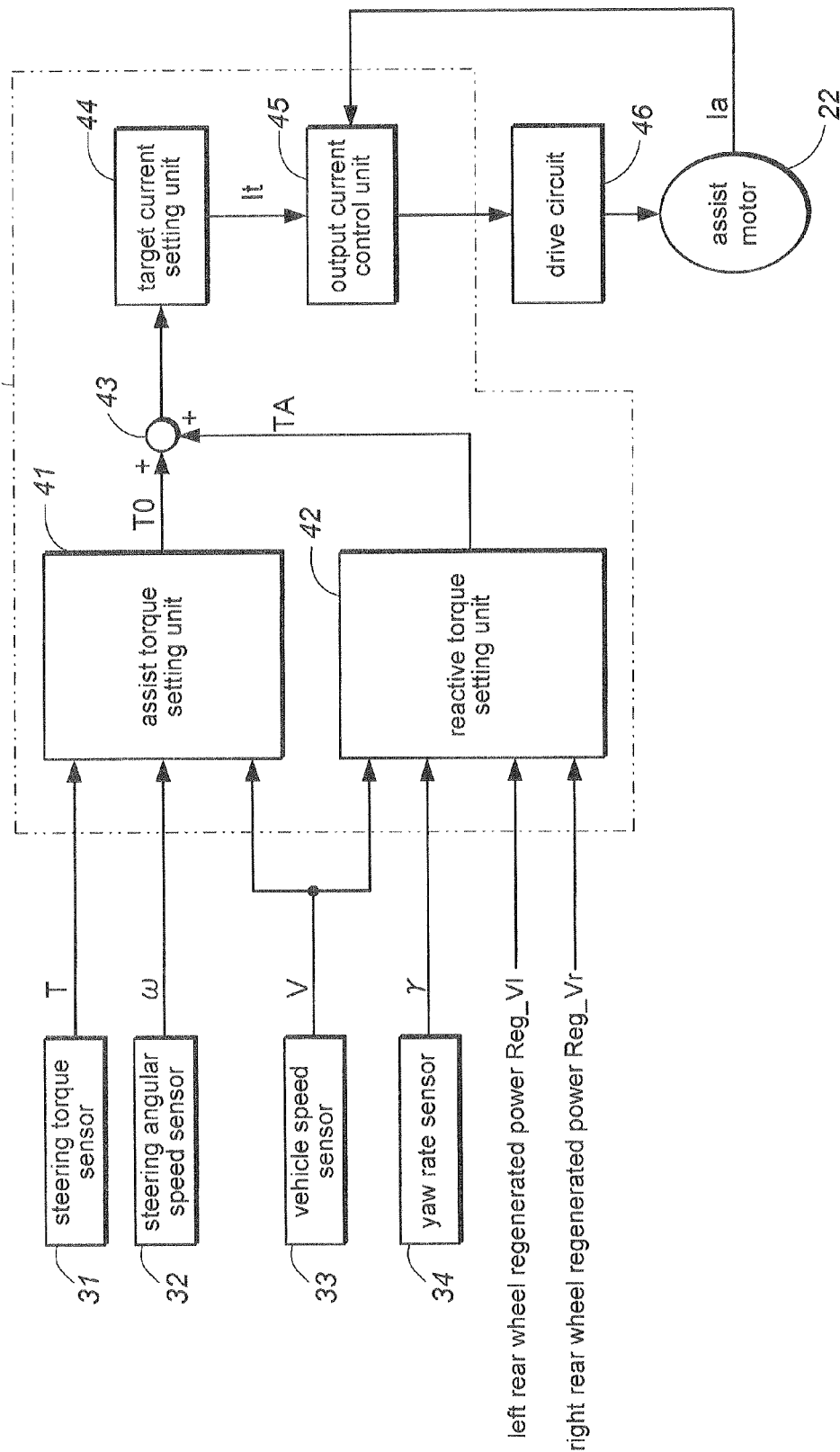
FIG. 2 is a block diagram of a control system of the electric power steering system shown in FIG. 1.

In the EPS ECU 38 which is illustrated in FIG. 2, an assist torque setting unit 41 receives the detection signals (steering torque T, steering angular speed ω and vehicle speed V) from the steering torque sensor 31, steering angular speed sensor 32 and vehicle speed sensor 33. Based on the received information, the assist torque setting unit 41 sets an assist torque target value T0 for a normal steering assist torque control by using prescribed data maps and formulas. A reactive torque setting unit 42 receives detection signals (vehicle speed V and yaw rate γ) from the vehicle speed sensor 33 and yaw rate sensor 34, and a data signal on the regenerative powers Reg_Vl and Reg_Vr of the left and right rear wheels from the PCU 39. From the received information, the reactive torque setting unit 42 computes a reactive torque target value TA by using prescribed data maps and formulas. The reactive torque target value TA corresponds to a steering resistance that reduces the assist steering torque. The reactive torque target value TA is added to the assist torque target value T0 in an adder 43, and the sum is forwarded to a target current setting unit 44.

The target current setting unit 44 sets a target current It for the assist motor 22 according to the output of the adder 43 (sum of the assist torque target value T0 and reactive torque target value TA), and forwards the target current It to an output current control unit 45. According to the target current It, the output current control unit 45 controls a drive circuit 46 and drives the assist motor 22. The output current control unit 45 performs a feedback control based on the actual current Ia and target current It of the assist motor 22.

Figure 3:
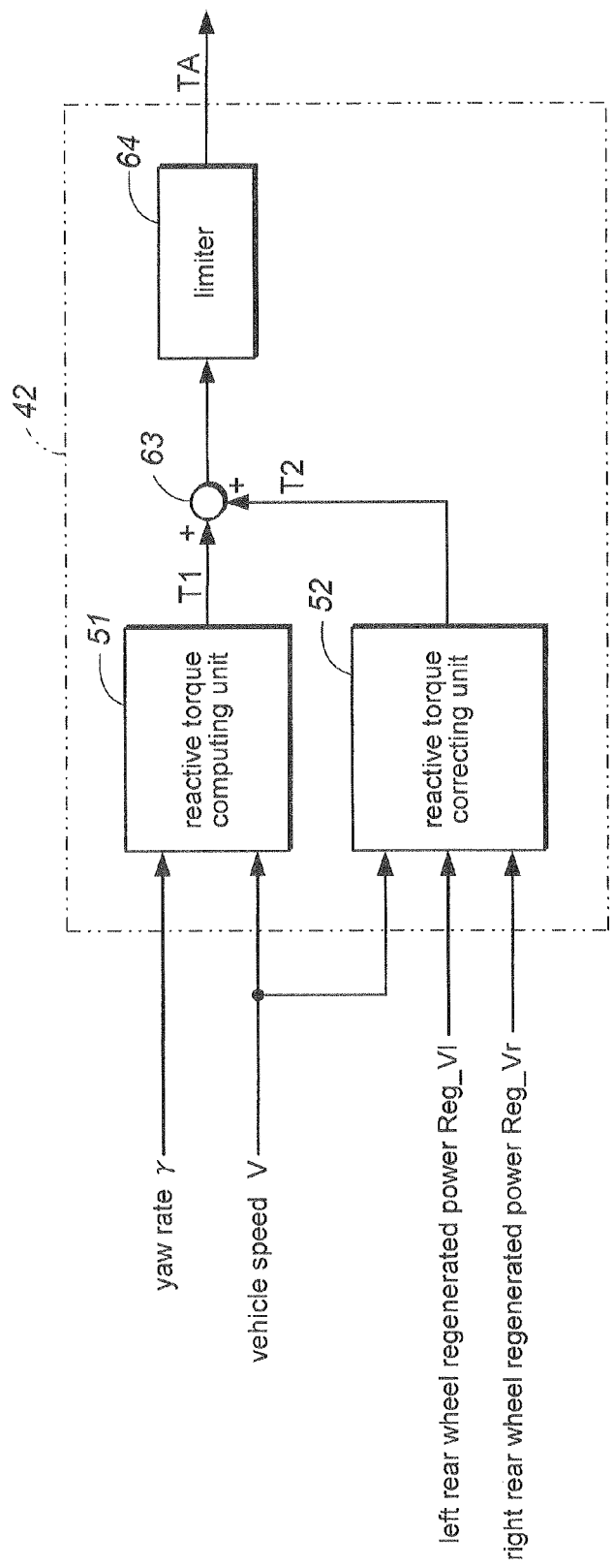
FIG. 3 is a detailed block diagram of a reactive torque setting unit in FIG. 2.

As shown in FIG. 3, a reactive torque computing unit 51 of the reactive torque setting unit 42 computes a base value T1 of the reactive torque according to the vehicle speed V and yaw rate γ.

Figure 4:
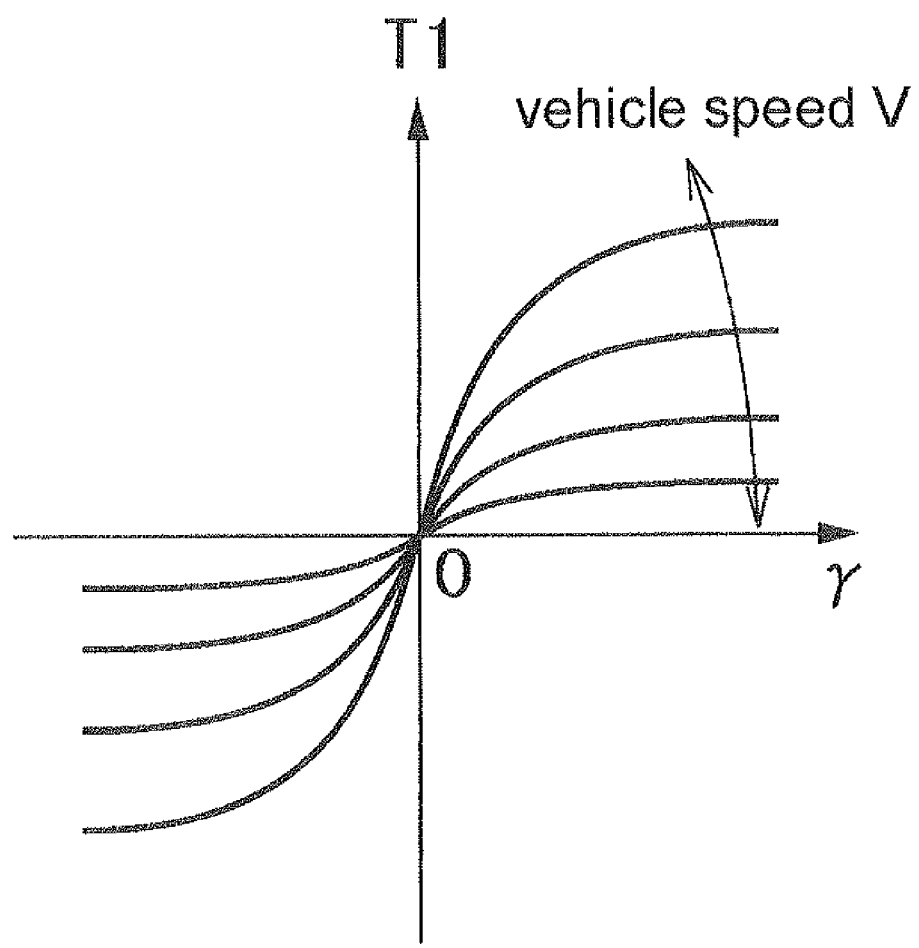
FIG. 4 is a graph representing data maps defining a relationship between a base value T1 of the reactive torque, vehicle speed V and yaw rate γ in FIG. 3.

The reactive torque computing unit 51 is configured to obtain the base value T1 of the reactive torque from data maps relating the base value T1 to the yaw rate γ for different vehicle speeds V as shown in FIG. 4. The data maps are configured such that the base value T1 gets greater as the vehicle speed V is increased for a given yaw rate γ. When the vehicle speed V is zero, the base value T1 is zero without regard to the value of the yaw rate γ.

Figure 5:
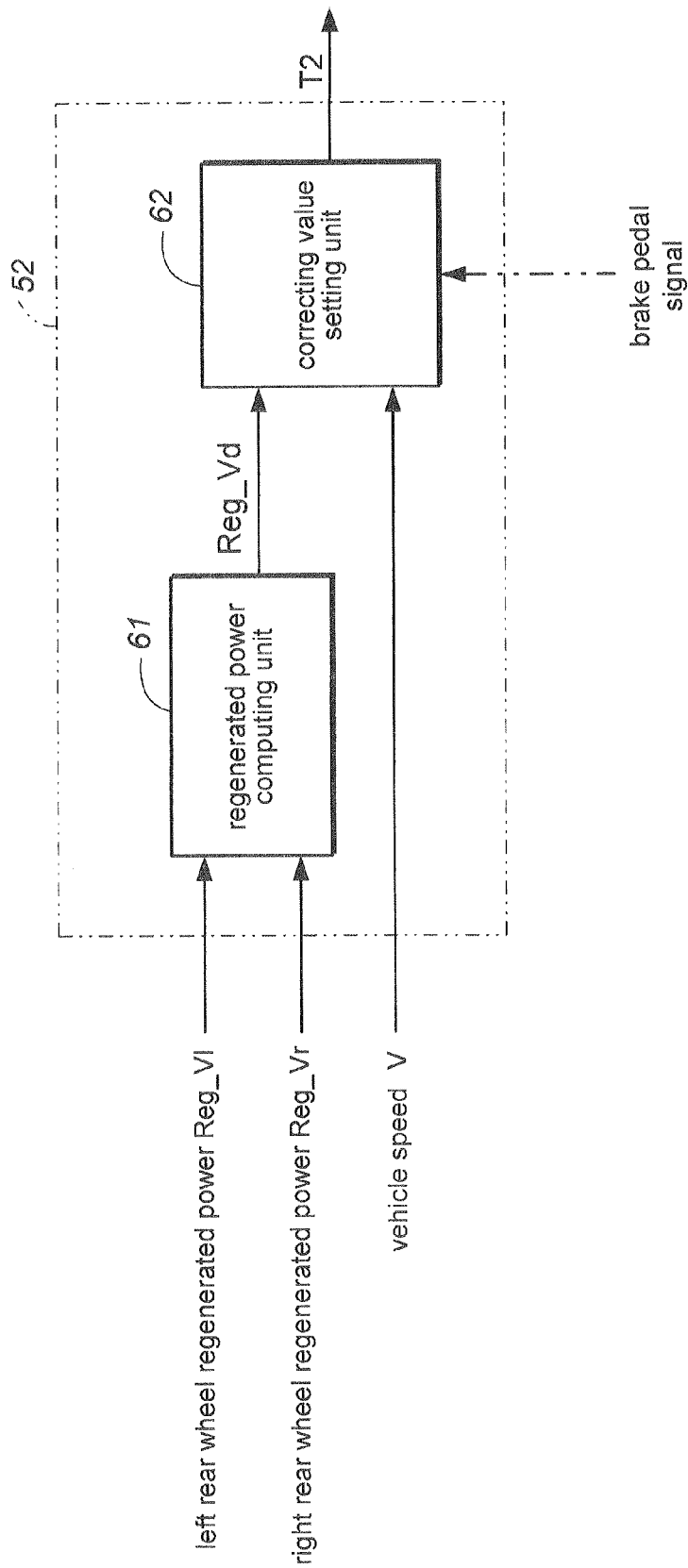
FIG. 5 is a detailed block diagram of a reactive torque correcting unit in FIG. 3.

In the reactive torque setting unit 42, the reactive torque correcting unit 52 sets a correction value T2 of the reactive torque. More specifically, as shown in FIG. 5, a regenerated power computing unit 61 computes a difference Reg_Vd between the left rear wheel regenerated power Reg_Vl and the right rear wheel regenerated power Reg_Vr, and forwards the difference to a correction value computing unit 62. The correction value setting unit 62 sets a correction value T2 of the reactive torque according to the difference Reg_Vd.

Figure 6:
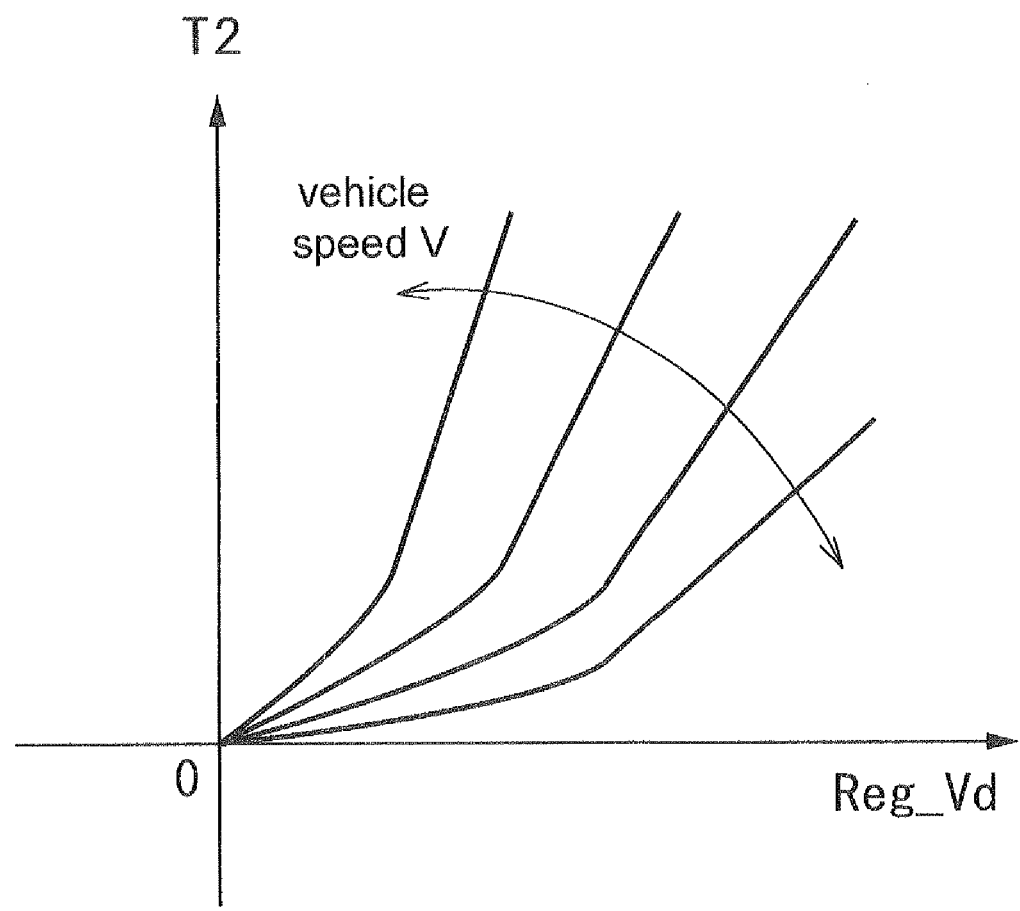
FIG. 6 is a graph representing data maps defining a relationship between a base value T2 of the reactive torque, vehicle speed V and regenerative power in FIG. 3.

The correction value setting unit 62 may provide the correction value T2 of the reactive torque from data maps relating the correction value T2 to the difference Reg_Vd for different vehicle speeds V as shown in FIG. 6. The data maps are configured such that the correction value T2 gets larger as the vehicle speed V is increased for a given yaw rate γ. The correction value T2 is zero when the difference Reg_Vd is zero, and is increased at least when the difference Reg_Vd is not zero (or when a regenerative braking is performed).

When a brake pedal not shown in the drawing is not depressed, because only the rear wheels 4rl and 4rr are braked by the rear drive motors 5l and 5r, a greater change in the behavior of the vehicle is likely to occur as compared to the time when the brake pedal is depressed (or when both the front and rear wheels are braked). Therefore, the correction value setting unit 62 may be configured to set the correction value T2 of the reactive torque only when the vehicle 1 is decelerating (such as when the depression of an accelerator pedal not shown in the drawings or the throttle opening is small or zero) and it is detected that the brake pedal is not depressed from the brake pedal signal (See FIG. 5).

Referring to FIG. 3, after the base value T1 of the reactive torque set by the reactive torque computing unit 51 and the correction value T2 of the reactive torque set by the reactive torque correcting unit 52 are added in the adder 63, the sum is forwarded to a limiter 64. The limiter 64 limits the reactive torque target value TA obtained as the sum of the base value T1 and correction value T2 within a prescribed range defined between a maximum value Tmax and a minimum value −Tmax, and the limited value of the reactive torque target value TA is produced.

Figure 7:
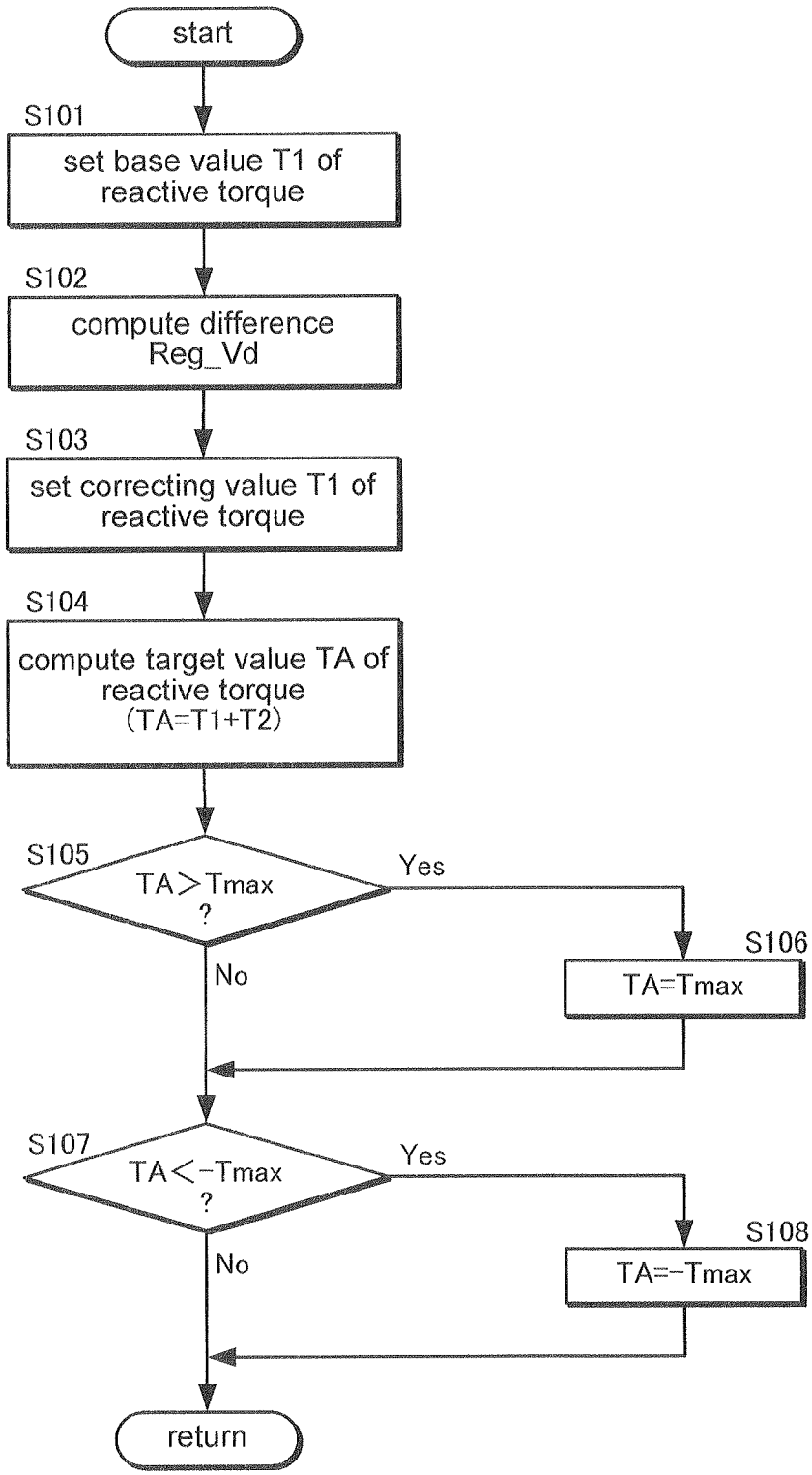
FIG. 7 is a flowchart showing the control process for determining a reactive torque correction value by the reactive torque setting unit in FIG. 2.

The process of setting the correction value T2 of the reactive torque by the reactive torque setting unit 42 is described in the following with reference to FIG. 7. First of all, the reactive torque computing unit 51 computes the base value T1 of the reactive torque from the data maps shown in FIG. 4 according to the received vehicle speed V and yaw rate γ (step S101).

In the reactive torque correcting unit 52, the regenerated power computing unit 61 computes the difference Reg_Vd between the left rear wheel regenerated power Reg_Vl and the right rear wheel regenerated power Reg_Vr (step S102). Thereafter, the correction value setting unit 62 computes the correction value T2 of the reactive torque from the data maps shown in FIG. 6 according to the difference Reg_Vd and vehicle speed V (step S103).

According to an alternate embodiment, the correction value T2 of the reactive torque may be obtained from the sum Reg_Vt of the left rear wheel regenerated power Reg_Vl and the right rear wheel regenerated power Reg_Vr. In such a case, the two rear wheels 4rl and 4rr may be driven by a single common electric motor via a differential device.

Thereafter, the adder 63 computes the reactive torque target value TA by summing the base value T1 and correction value T2 (step S104). The limiter 64 then compares the reactive torque target value TA with the prescribed maximum value Tmax (step S105). If the reactive torque target value TA is greater than the maximum value Tmax (step S105: Yes), TA is set as Tmax (TA=Tmax) (step S106). The limiter 64 then compares the reactive torque target value TA with the prescribed minimum value −Tmax (step S107). If the reactive torque target value TA is smaller than the minimum value −Tmax (step S105: No), TA is set as −Tmax (TA=−Tmax) (step S108). When the reactive torque target value TA has a value intermediate between the maximum value Tmax and minimum value −Tmax, the value of the reactive torque target value TA is not altered.

In the electric power steering system described above, when the regeneration by the rear drive motors is in progress, the reactive torque setting unit 42 increases the reactive torque output value TA (or increases the correction value T2). By increasing the reactive torque (or reducing the assisting torque) during a regenerative braking, the change in the behavior of the vehicle during the regenerative braking, and the handling of the vehicle can be improved.

In particular, because the reactive torque setting unit 42 is configured to set the correction value T2 according to the difference in the regenerative power between the left and right rear wheels, the electric power steering system 21 is enabled to favorably control the changes in the behavior of the vehicle.

The reactive torque setting unit 42 is configured to compute the base value T1 of the reactive torque according to the yaw rate γ and vehicle speed V, and correct the base value T1 with the correction value T2 during a regenerative braking. Therefore, the reactive torque can be favorably controlled during a regenerative braking by performing a relatively simple control process.

The correction value T2 of the reactive torque was added to the base value T1 of the reactive torque in the foregoing embodiment, but other modes of correction can be used without departing from the spirit of the present invention as long as the correction results in the increase in the reactive torque output value TA during a regenerative braking. For instance, a correction coefficient computed in dependence of the regenerative power may be multiplied to the base value T1 of the reactive torque. The electric motors were used for driving the rear wheels in the foregoing embodiment, but the present invention can be applied to other types of vehicles where electric motors are used for driving front wheels instead of or in addition to the rear wheels.

Although the present invention has been described in terms of a preferred embodiment thereof, it is obvious to a person skilled in the art that various alterations and modifications are possible without departing from the scope of the present invention which is set forth in the appended claims.

The contents of the original Japanese patent application on which the Paris Convention priority claim is made for the present application, as well as the contents of any prior art mentioned in the present application, are incorporated in this application by reference.

The invention claimed is:

1. A steering system for a vehicle incorporated with a rear drive electric motor for driving a pair of rear wheels that can function as a regenerative brake for the rear wheels, comprising:
   a steering mechanism for steering front wheels of the vehicle;
   a power steering assist unit configured to assist a manual effort to steer the front wheels; and
   a steering torque control unit configured to reduce a steering assist torque provided by the power steering assist unit when the rear drive electric motor is providing a regenerative braking,
   wherein the steering torque control unit includes an assist torque setting unit for setting an assist torque that assists a steering effort and a reactive torque setting unit for setting a reactive torque that increases the steering effort, a final steering assist torque provided by the power steering assist unit being determined as a combination of the assist torque provided by the assist torque setting unit and the reactive torque provided by the reactive torque setting unit.

2. The steering system for a vehicle according to claim 1, wherein the steering torque control unit reduces a steering assist torque according to a regenerative power of the rear drive electric motor.

3. The steering system for a vehicle according to claim 1, wherein the reactive torque is determined as a mathematic function of a regenerative power of the rear drive electric motor.

4. The steering system for a vehicle according to claim 3, wherein the reactive torque is determined as a mathematic function of a vehicle speed, a yaw rate of the vehicle and a regenerative power of the rear drive electric motor.

5. The steering system for a vehicle according to claim 1, wherein the rear wheels are driven by individual rear drive electric motors, and the reactive torque is given as a mathematical function of a difference between the regenerative powers of the rear drive electric motors for the rear wheels.

6. A steering system for a vehicle incorporated with a rear drive electric motor for driving a pair of rear wheels that can function as a regenerative brake for the rear wheels, comprising:
- a steering mechanism for steering front wheels of the vehicle;
- a power steering assist unit configured to assist a manual effort to steer the front wheels; and
- a steering torque control unit configured to reduce a steering assist torque provided by the power steering assist unit when the rear drive electric motor is providing a regenerative braking, wherein the steering torque control unit reduces a steering assist torque according to a regenerative power of the rear drive electric motor, and wherein the rear wheels are driven by individual rear drive electric motors, and the steering torque control unit reduces a steering assist torque according to a difference between the regenerative powers of the rear drive electric motors.

7. The steering system for a vehicle according to claim 6, wherein the steering torque control unit includes an assist torque setting unit for setting an assist torque that assists a steering effort and a reactive torque setting unit for setting a reactive torque that increases the steering effort, a final steering assist torque provided by the power steering assist unit being determined as a combination of the assist torque provided by the assist torque setting unit and the reactive torque provided by the reactive torque setting unit.

8. The steering system for a vehicle according to claim 7, wherein the reactive torque is determined as a mathematic function of a regenerative power of the rear drive electric motor.

9. The steering system for a vehicle according to claim 8, wherein the reactive torque is determined as a mathematic function of a vehicle speed, a yaw rate of the vehicle and a regenerative power of the rear drive electric motor.

10. The steering system for a vehicle according to claim 7, wherein the rear wheels are driven by individual rear drive electric motors, and the reactive torque is given as a mathematical function of a difference between the regenerative powers of the rear drive electric motors for the rear wheels.

* * * * *